United States Patent
Oroskar et al.

(10) Patent No.: US 10,117,223 B1
(45) Date of Patent: Oct. 30, 2018

(54) CONTROL OF PAGING BASED ON WHETHER MOST RECENT SERVING BASE STATION IS A RELAY BASE STATION

(71) Applicant: Sprint Spectrum L.P., Overland Park, KS (US)

(72) Inventors: Siddharth S. Oroskar, Overland Park, KS (US); Jasinder P. Singh, Olathe, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 5 days.

(21) Appl. No.: 15/420,510

(22) Filed: Jan. 31, 2017

(51) Int. Cl.
*H04W 68/02* (2009.01)
*H04B 7/14* (2006.01)
*H04W 88/08* (2009.01)

(52) U.S. Cl.
CPC ............ *H04W 68/02* (2013.01); *H04B 7/14* (2013.01); *H04W 88/08* (2013.01)

(58) Field of Classification Search
CPC ......... H04W 68/02; H04W 88/08; H04B 7/14
See application file for complete search history.

(56) References Cited

U.S. PATENT DOCUMENTS

| | | | | |
|---|---|---|---|---|
| 8,818,427 B1* | 8/2014 | Goyal | ............... | H04B 7/15507 455/458 |
| 9,232,516 B1* | 1/2016 | Oroskar | ............... | H04W 36/06 |
| 2010/0093389 A1* | 4/2010 | Asokan | ............... | H04W 68/12 455/552.1 |
| 2011/0045763 A1* | 2/2011 | Mohanty | ............... | H04W 80/04 455/7 |
| 2013/0143563 A1* | 6/2013 | Singh | ............... | H04W 68/02 455/436 |
| 2014/0169259 A1* | 6/2014 | Lee | ............... | H04L 12/189 370/312 |
| 2015/0237592 A1* | 8/2015 | Kim | ............... | H04W 60/04 455/435.1 |
| 2017/0181218 A1* | 6/2017 | Liu | ............... | H04W 68/005 |
| 2017/0289957 A1* | 10/2017 | Zhang | ............... | H04W 68/02 |

\* cited by examiner

*Primary Examiner* — Lester Kincaid
*Assistant Examiner* — William Wang (57) ABSTRACT

A method and system for paging of a wireless client device (WCD). When a wireless communication system encounters a trigger to page a WCD, the system will identify the WCD's most recent serving base station (e.g., the WCD's currently registered base station, or the base station providing the WCD's currently registered coverage area) and will determine whether that base station is a relay base station or rather a non-relay base station. If the base station is a non-relay base station, then the system will provide the initial page of the WCD via just that base station (e.g., as in the zone based paging process discussed above). Whereas, if the base station is a relay base station, then the system will provide the initial (ordinal first) page of the WCD via both that base station and the donor base station that provides the relay base station's wireless backhaul connection.

20 Claims, 7 Drawing Sheets

Fig. 7 though the network infrastructure manages
CONTROL OF PAGING BASED ON WHETHER MOST RECENT SERVING BASE STATION IS A RELAY BASE STATION

BACKGROUND

A typical wireless communication network includes a number of base stations each radiating to provide one or more coverage areas in which wireless client devices (WCDs) such as cell phones, tablet computers, tracking devices, embedded wireless modules, and other wirelessly equipped devices, can operate. In turn, each base station could be coupled with network infrastructure that manages service of WCDs and that provides connectivity with one or more transport networks such as the public switched telephone network (PSTN) and/or the Internet. With this arrangement, a WCD within coverage of a base station may engage in air interface communication with the base station and could thereby communicate via the base station with various remote network entities or with other served WCDs.

Such a network could operate in accordance with a particular radio access technology, with communications from the base stations to WCDs defining a downlink or forward link and communications from the WCDs to the base stations defining an uplink or reverse link. Examples of existing radio access technologies include, without limitation, Long Term Evolution (using Orthogonal Frequency Division Multiple Access (OFDMA) on the downlink and Single Carrier Frequency Division Multiple Access (SC-FDMA) on the uplink), Code Division Multiple Access (CDMA) (e.g., 1×RTT and 1×EV-DO), Global System for Mobile Communications (GSM), and Wi-Fi, among others. Each technology may define its own procedures for managing communications with WCDs.

In accordance with the radio access technology, each base station coverage area could have a coverage area ID and could operate on one or more carrier frequencies. Further, each coverage area could define a number of channels or other resources for carrying specific communications between the base station and WCDs. For instance, on the downlink, certain resources may be used to carry a pilot signal or reference signal that WCDs can detect and measure as a basis to evaluate coverage, and other resources may be used to carry other control signaling and bearer data communications from the base station to WCDs. And on the uplink, certain resources may be used to carry access requests from WCDs, and other resources may be used to carry other control signaling and bearer data communications from WCDs to the base station.

When a WCD first powers on or enters into coverage of such a network, the WCD could search for a strongest coverage area in which to operate and could then engage in signaling with the base station that provides that coverage area, and in turn with the network infrastructure, to register for service in that coverage area. In turn, the WCD could then be served by the base station in a connected (e.g., active) mode or in an idle mode.

In the connected mode, the WCD would have a radio-link-layer connection with the base station, through which to engage in calls and/or other bearer communication. Whereas, in the idle mode, the WCD may lack a radio-link-layer connection but could "idle" in the base station's coverage area, monitoring the air interface for any page messages destined to the WCD, and the WCD and base station could engage in signaling when necessary to re-establish such a connection. Thus, if the network has a call or other bearer communication to provide to the WCD, the base station could broadcast a page message destined to the WCD, and the WCD could detect that page message and responsively engage in signaling with the base station to re-establish a radio-link-layer connection so as to then receive the communication. And if the WCD has a call or other bearer communication to initiate, the WCD could similarly engage in signaling with the base station to re-establish a radio-link-layer connection and could then provide that communication.

In both the connected mode and the idle mode, a WCD may also engage in handover between coverage areas from time to time. For instance, as the WCD moves from one coverage area to another and/or as circumstances otherwise change, the WCD may experience a threshold decrease in signal strength from its serving coverage area and a threshold increase in signal strength from a target coverage area. When this happens in the connected mode, the WCD may responsively provide a measurement report to its serving base station, and the base station and network infrastructure may then coordinate transition of the WCD to be served by the target coverage area. Whereas, when this happens in the idle mode, the WCD may autonomously transition to idle in the target coverage area, monitoring the air interface of the target coverage area for any page messages destined to the WCD, and engage in signaling when necessary to transition to the connected mode in the target coverage area.

To facilitate efficient paging of idle-mode WCDs given their possible handover between coverage areas, the coverage areas of a typical wireless communication network could be grouped into clusters defining paging zones (or tracking areas), with each paging zone having an associated zone ID. Further, the base station of each coverage area could be configured to broadcast the coverage area's associated zone ID, and each WCD could be configured to read the broadcast zone ID of the coverage area in which it operates. And the network infrastructure could include a paging controller to track WCDs' current paging zones and to accordingly manage paging.

In practice with this arrangement, when a WCD registers for service in given coverage area, the WCD and paging controller could record the coverage area ID and the associated the zone ID of the WCD's current serving coverage area. In turn, if the WCD hands over between coverage areas while in the connected mode, the WCD and paging controller could update their records to indicate the coverage ID and associated zone ID of the WCD's new serving coverage area. Further, if the WCD hands over between coverage areas while in the idle mode, the WCD could check to see if the zone ID of the new serving coverage area is different than the zone ID of the previously serving coverage area. And if the zone ID is different, then the WCD could responsively engage in signaling with the base station of the new coverage area to re-register for service in the new coverage area, and the WCD and paging controller could update their records to indicate the coverage ID and associated new zone ID of the WCD's new serving coverage area.

When the network infrastructure then has a communication to provide to an idle-mode WCD, the paging controller could engage in a zone-based paging process, in which the paging controller engages in a series of page attempts with progressively increasing coverage range to account for the possibility that the WCD has moved away from its currently recorded coverage area but has not yet entered into a new paging zone. In particular, the paging controller could transmit an initial (ordinal first) page to the WCD in the WCD's currently recorded serving coverage area. And absent a response to that initial page, the paging controller could then transmit a next page to the WCD in a somewhat wider region encompassing the WCD's currently recorded serving coverage area and perhaps each adjacent coverage area. And still absent a response from the WCD, the paging controller could then transmit a next (possibly final) page to the WCD in all of the coverage areas of the WCD's currently recorded paging zone, which should hopefully result in a response from the WCD.

Advantageously, this process could thus help ensure efficient and successful paging of the WCD.

Overview

Optimally, a wireless service provider will strategically implement base stations throughout a market area so that served WCDs can transition between the base stations' coverage areas without loss of coverage. Each base station may include an antenna structure and associated equipment, and the wireless service provider may connect the base station by a landline cable (e.g., a T1 line) with the service provider's core network infrastructure, to enable the base station to communicate with the network infrastructure.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To provide coverage in such situations, the wireless service provider may therefore implement relay base stations, each of which could be configured to operate in much the same way as a conventional landline-connected base station but would have a wireless backhaul connection to the core network infrastructure. In particular, each relay base station could have an associated WCD module that would be served by an existing base station of the network, referred to as a donor base station, with the air interface between the WCD module and the donor base station defining a wireless backhaul connection for the relay base station. Thus, the relay base station could communicate with the core network infrastructure via the WCD module, the wireless backhaul connection, and the donor base station.

This relay base station arrangement presents an interesting opportunity for paging a WCD. In particular, in a typical relay base station arrangement, the coverage area of the relay base station would at least partially overlap with coverage of the donor base station that provides its wireless backhaul connectivity, and in many implementations the coverage area of the relay base station would be being fully encompassed by the coverage area of the donor base station—allowing for the possibility that a WCD served by the relay base station may also be within coverage of the donor base station. Given this, in a zone based paging process, if a WCD's currently registered coverage area is a relay base station coverage area, it could be useful to provide the initial page of the WCD not only in the relay base station coverage area but also in the donor base station coverage area.

Accordingly, disclosed herein is a method and system for improved paging of a WCD. In accordance with the disclosure, when a wireless communication system encounters a trigger to page a WCD, the system will identify the WCD's most recent serving base station (e.g., the WCD's currently registered base station, or the base station providing the WCD's currently registered coverage area) and will determine whether that base station is a relay base station or rather a non-relay base station. If the base station is a non-relay base station, then the system will provide the initial page of the WCD via just that base station (e.g., as in the zone based paging process discussed above). Whereas, if the base station is a relay base station, then the system will provide the initial (ordinal first) page of the WCD via both that base station and the donor base station that provides the relay base station's wireless backhaul connection.

Thus, in one respect, disclosed is a method of controlling paging of a WCD in a wireless communication system having a plurality of base stations, where each base station is either (i) a relay base station having a wireless backhaul connection served by a donor base station or (ii) a non-relay base station not having a wireless backhaul connection served by a donor base station. As disclosed, the method includes encountering a trigger to page the WCD. Further, the method includes, responsive to the trigger, (a) identifying a most recent serving base station of the WCD, (b) making a determination of whether the identified base station is a relay base station or rather a non-relay base station, and (c) based on the determination, controlling whether to broadcast an initial page for the WCD via just the identified base station. And in accordance with the method, (i) if the determination is that the identified base station is a non-relay base station, then the initial page for the WCD is broadcast via just the identified base station, i.e., not via another base station as well, and (ii) if the determination is that the identified base station is a relay base station, then the initial page for the WCD is broadcast via both the identified base station and the donor base station that serves the wireless backhaul connection for the identified base station.

Further, the disclosed method for controlling paging of a WCD could take other forms. For instance, the disclosed method could include receiving into a paging controller a signaling message indicative of a communication that is to be provided to the WCD. And the disclosed method could the include, responsive to the signaling message, (a) making a determination of whether an identified most recent serving base station of the WCD is a relay base station or is rather a non-relay base station, and (b) responsive to the determination being that the identified most recent serving base station of the WCD is a relay base station, providing an initial page of the WCD via both (i) the identified most recent serving base station of the WCD and (ii) a donor base station that serves a wireless backhaul connection for the identified most recent serving base station.

Still further, disclosed is a paging controller operable in a wireless communication system to control paging of a WCD, where the wireless communication system has a plurality of base stations, and where each base station is either (i) a relay base station having a wireless backhaul connection served by a donor base station or (ii) a non-relay base station not having a wireless backhaul connection served by a donor base station. As disclosed, the paging controller could include a network communication interface through which to engage in network communications with at least the base stations, a processing unit, non-transitory data storage, and program instructions stored in the non-transitory data storage and executable by the processing unit to carry out various operations such as those noted above.

In particular, the paging controller operations could include encountering a trigger to page the WCD and, responsive to the trigger, (a) identifying a most recent serving base station of the WCD, (b) making a determination of whether the identified base station is a relay base station or rather a non-relay base station, and (c) based on the determination, controlling whether to broadcast an initial page for the WCD via just the identified base station. If the determination is that the identified base station is a non-relay base station, then the paging controller could cause the initial page for the WCD to be broadcast via just the identified base station. Whereas, if the determination is that the identified base station is a relay base station, then the paging controller could cause the initial page for the WCD to be broadcast via both the identified base station and the donor base station that serves the wireless backhaul connection for the identified base station.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example communication system in which features of the present disclosure can be implemented. It should be understood, however, that the arrangement shown and described here and other arrangements and processes described in this document can take other forms. For instance, elements can be added, removed, combined, replicated, distributed, re-ordered, re-positioned, or otherwise changed. Further, operations described herein as being carried out by one or more entities could be implemented by a programmed processing unit and/or by various other configurations, as those of ordinary skill in the art would understand.

Figure 1:
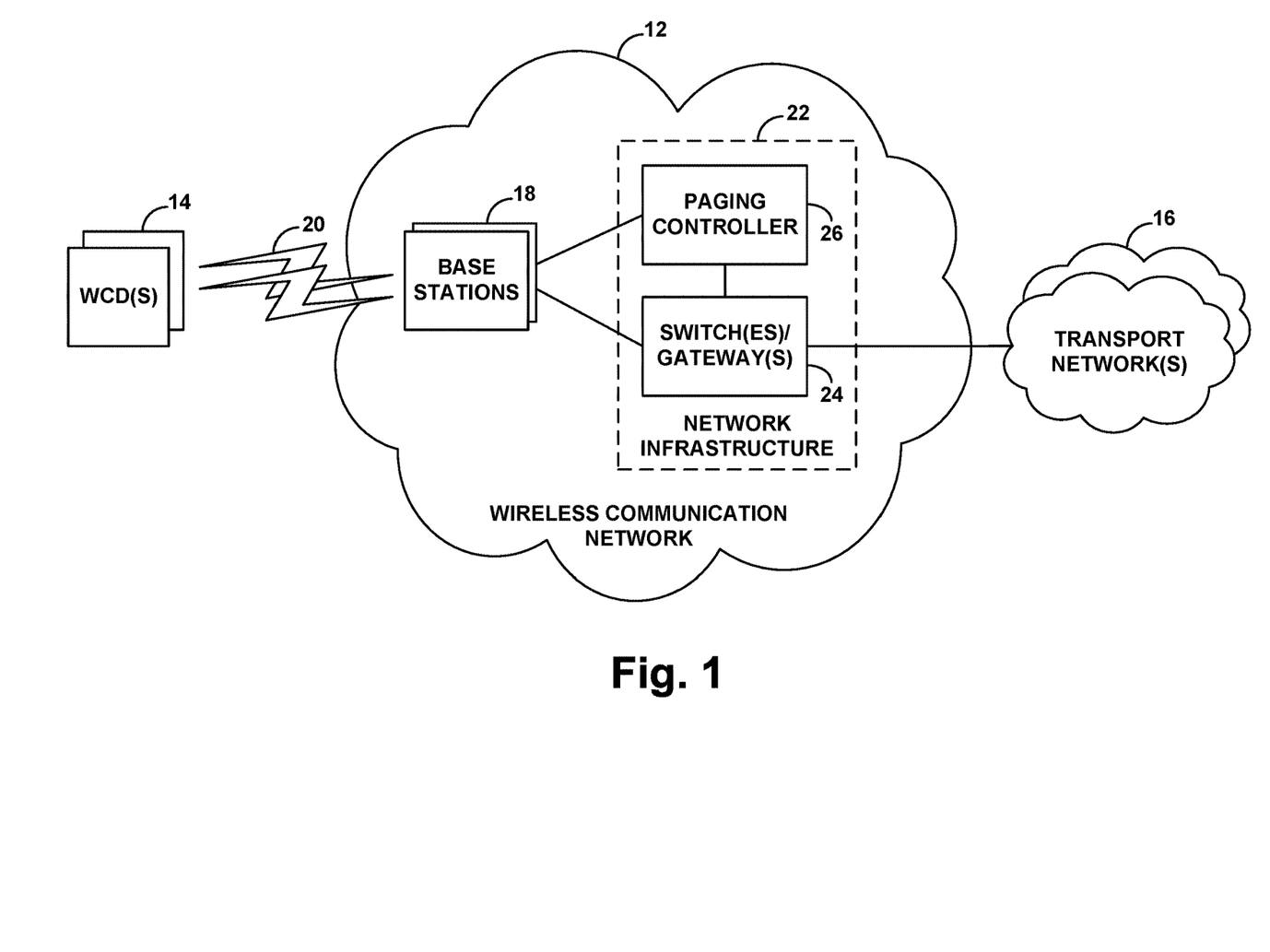
FIG. 1 is a simplified block diagram of an example communication system in which features of the present disclosure can be implemented.

The example system shown in FIG. 1 includes at its core a wireless communication network 12 configured to provide one or more WCDs 14 with connectivity to communicate on one or more transport networks 16. As shown by way of example, the wireless communication network 12 includes a plurality of base stations 18 radiating to provide wireless coverage areas 20 in which to serve WCDs, and further includes network infrastructure 22 for managing WCD service and providing connectivity with the transport network(s) 16.

In this arrangement, the network infrastructure 22 includes one or more switches and/or gateways 24, which provide connectivity between the base stations 18 and the transport network(s), and the network infrastructure 22 further includes a paging controller 26, which manages paging of WCDs. In an alternative arrangement, by way of example, the paging controller functionality could be integrated with the switch/gateway functionality.

Depending on the radio access technology in use, these components and this arrangement could take various forms.

For example, in a CDMA network, the network infrastructure could include a mobile switching center (MSC) that serves both as a switch providing connectivity with a transport network such as the PSTN and as a paging controller to track WCD paging zones and to manage paging of WCDs. In addition, the network could further include a packet data serving node (PDSN) that provides connectivity with the Internet and that is communicatively linked with the MSC. Further, the MSC could be communicatively linked (e.g., via a base station controller) with the base stations (base transceiver stations (BTSs)), and the CDMA air interface in each base station coverage area could define one or more paging channels that idle-mode WCDs could monitor for paging messages. When a call or other communication arrives for a served idle-mode WCD, the MSC may receive a signaling message indicative of that communication, and the MSC may responsively initiate a process of paging the WCD via one or more of the BTSs.

Whereas, in an LTE network, the network infrastructure could include gateways (e.g., a serving gateway (SGW) and packet data network gateway (PGW)) that provide connectivity with a transport network such as the Internet, and the network infrastructure could further include a mobility management entity (MME) that operates as a paging controller to track WCD paging zones (tracking areas) and to manage paging of WCDS. In this arrangement, the gateways and MME could each be communicatively linked with the base stations (evolved Node-Bs (eNodeBs)), and the SGW could be communicatively linked with the MME. Further, the LTE air interface in each eNodeB coverage area could define a shared channel region for carrying page messages and a control region that idle-mode WCDs could monitor for signaling indicating the presence of page messages in the shared channel region. Thus, when packet data arrives at the SGW for a served idle-mode WCD, or when another communication arrives for the WCD, the MIME may receive a signaling message indicative of the communication, and the MME may responsively initiate a process of paging the WCD via one or more of the eNodeBs.

Each base station in this arrangement could take various forms, and the base stations could differ in form from each other. For example, a base station could be a macro base station having an antenna structure situated on a tower or the like, configured to provide a relatively wide range of coverage. Or the base station could be a small-cell base station (e.g., a femtocell) having a typically smaller form factor and typically being situated lower and configured to provide a relatively narrower range of coverage. Each base station may further include associated equipment, such as a radio and a power amplifier, to facilitate radio frequency communication via its antenna structure in line with an applicable radio access technology. And each base station could be configured to provide one or more coverage areas.

In line with the discussion above, in this arrangement, when a WCD initially enters into coverage of the system or engages in idle-mode handover into a coverage area having a new paging zone ID, the WCD could register with the network. For instance, the WCD could transmit to the base station providing the WCD'S current coverage area a registration message (or tracking area update message), which the base station could forward to the paging controller, and the paging controller could record in a data record for the WCD the WCD's current serving coverage area ID and paging zone ID. Further, if the WCD engages in connected mode handover to a new coverage area, the paging controller could likewise receive signaling indicating that transition and could similarly record the WCD's current serving coverage area ID and paging zone ID.

Further in line with the discussion above, when the paging controller encounters a trigger to page the WCD (e.g., when the paging controller receives a signaling message indicative of a call, incoming packet-data, or other bearer communication to be provided to the WCD), the paging controller could initiate a process of paging the WCD via one or more base stations. In particular, the paging controller could signal to one or more base stations to direct each such base station to broadcast a page message addressed to the WCD, and each such base station could responsively broadcast a page message to the WCD. If the WCD is idling within coverage of such a base station and detects the page message, the WCD may then responsively engage in signaling with the base station to establish a radio-link layer connection with the base station, and associated page-response signaling may pass to the paging controller to trigger providing of the bearer communication via the base station to the WCD.

As explained above, in a traditional zone-based paging process, the paging controller could engage in a sequence of page message transmissions via progressively wider sets of coverage areas, starting with an initial (ordinal first) page via the WCD's currently registered (i.e., last known) serving coverage area. For simplicity, this process could be describe with respect to the base stations providing these coverage areas.

Figure 2:
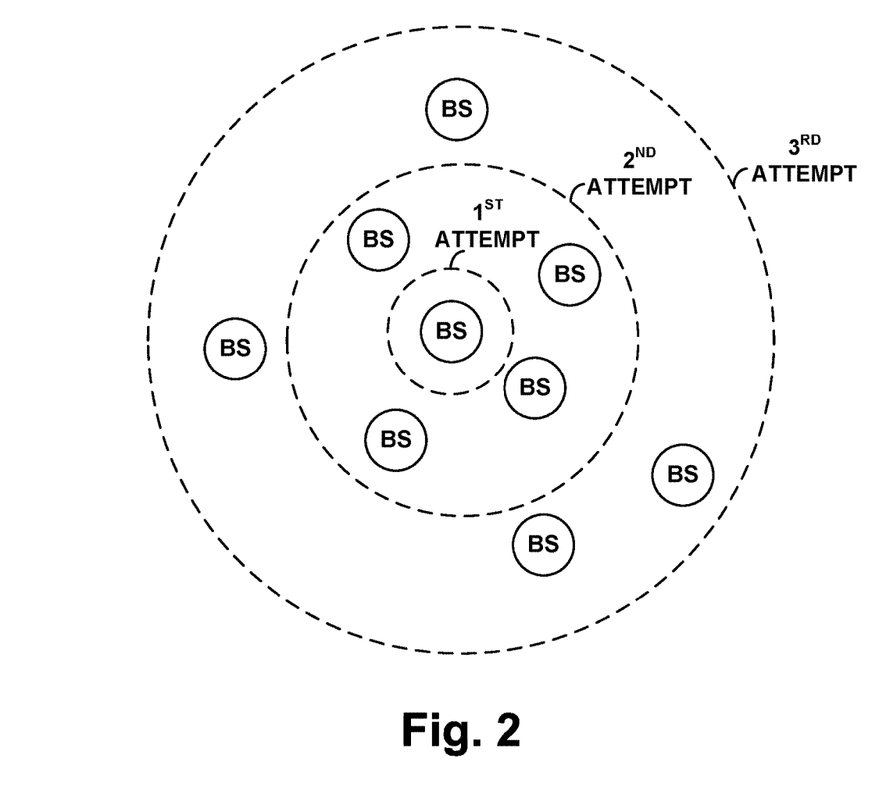
FIG. 2 is a depiction of a zone-based paging arrangement.

FIG. 2 depicts an example of a zone-based paging arrangement, where the base station at the center provides the WCD's currently registered coverage area and is thus the WCD's last known serving base station. As shown in FIG. 2, the paging controller could provide an initial (first) page to the WCD via just that last known serving base station. Absent a response from the WCD, the paging controller could then provide a next (second) page to the WCD via both the last known base station and each adjacent base station. And still absent a response from the WCD, the paging controller could then provide a next (third, possibly final) page to the WCD via all of the base stations in the WCD's paging zone.

Figure 3:
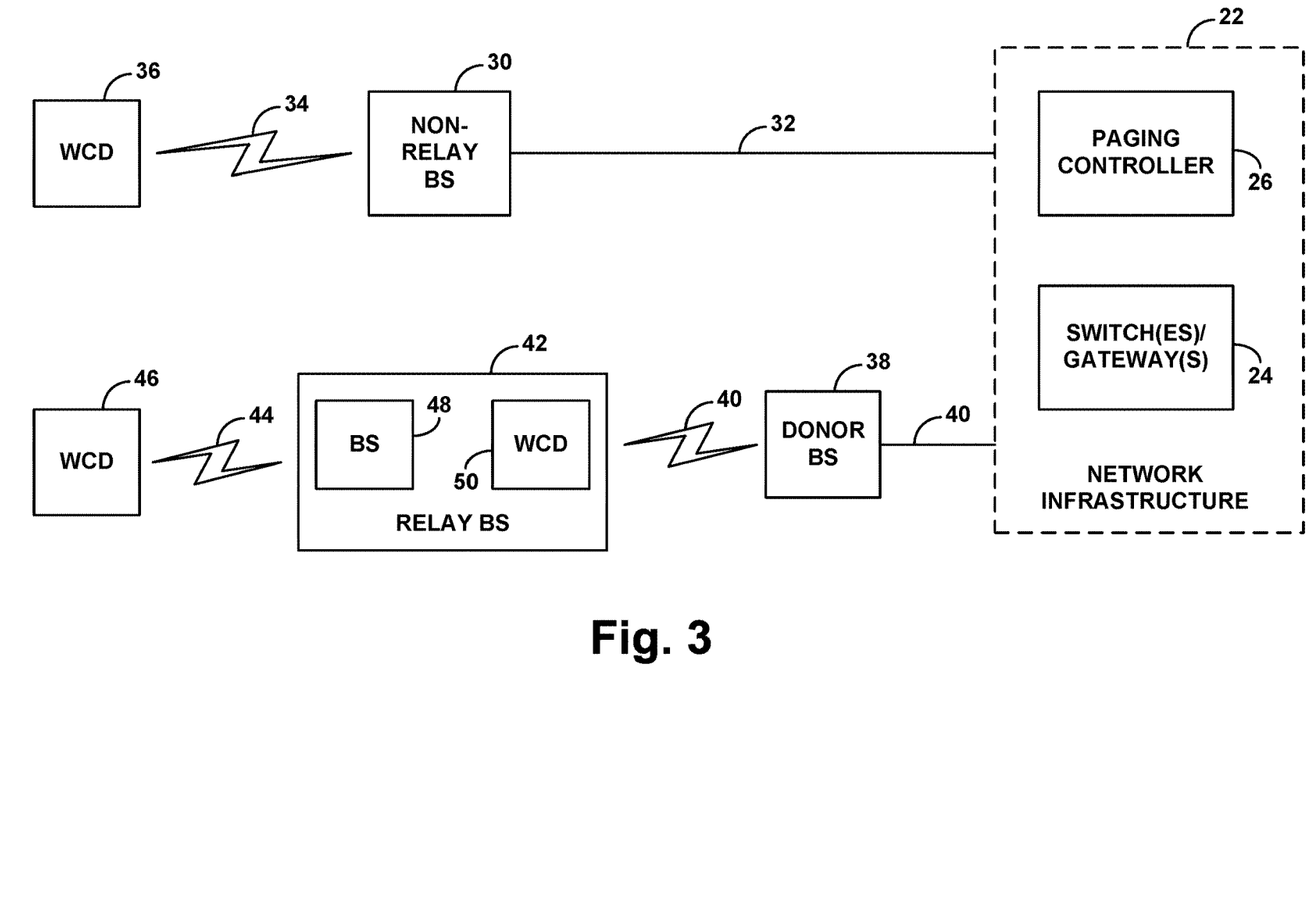
FIG. 3 is simplified block diagram depicting non-relay and relay base station configurations.

FIG. 3 next illustrates example non-relay and relay base station configurations for serving WCDs in a representative wireless communication network.

In particular, FIG. 3 shows representative network infrastructure 22 communicatively being linked with a non-relay base station 30 having a landline backhaul connection 32, and the non-relay base station providing a coverage area 34 in which to serve WCDs such as a representative WCD 36. Here, we can assume that the currently registered serving base station of WCD 36 is non-relay base station 30 (or that non-relay base station 30 is the base station that provides the currently registered coverage area 34 of WCD 36), with the understanding as well that WCD 36 may have engaged in idle-mode handover away from that coverage area.

Further, FIG. 3 shows the network infrastructure 22 also being communicatively linked with a donor base station 38 having a landline backhaul connection 40, the donor base station 38 providing a coverage area 40, and a relay base station 42 being served by in coverage area 40 by the donor base station 38 and providing a coverage area 44 in which to serve WCDs such as a representative WCD 46. As shown, the representative relay base station 42 includes a base station module 48 (e.g., a "mini-macro", small-cell base station, or the like) and a WCD module 50. Thus, the WCD module 50, and thus the relay base station 42, could be served by the donor base station 38, so that the relay base station would have a wireless relay backhaul connection comprising the air interface of coverage area 40 between donor base station 38 and relay base station 42. Here, we can assume that the currently registered serving base station of WCD 46 is relay base station 42 (e.g., base station module 48) (or that relay base station 42 is the base station that provides the currently registered coverage area 44 of WCD 46), with the understanding as well that WCD 46 may have engaged in idle-mode handover away from that coverage area.

In the representative arrangement, network infrastructure (e.g., paging controller) also includes or has access to data that indicates for each base station whether the base station is a non-relay base station or is rather a relay base station. Thus, with the arrangement shown, network infrastructure would have data that indicates that base station 42 (or base station module 48) is a relay base station, having a wireless backhaul connection provided by a donor base station, and that base station 30 is a non-relay base station not having a wireless backhaul connection provided by a donor base station. This data could be provisioned in the network by manual engineering input as base stations are put into service. Or the data could be automatically provisioned when base stations are put into service or during operation of the base stations.

Figure 4A:
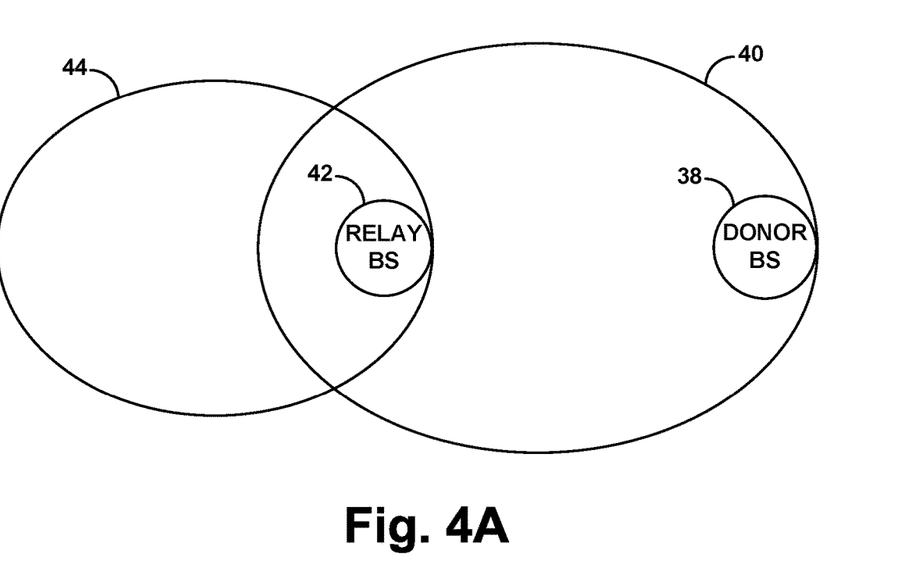
FIGS. 4A and 4B depict example arrangements of relay base station coverage and donor base station coverage.
Figure 4B:
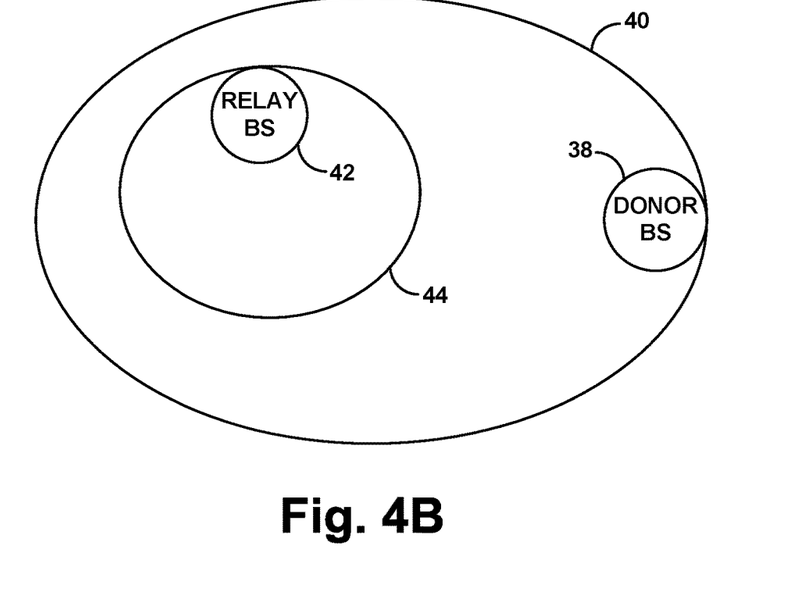

FIGS. 4A and 4B next depict example arrangements of the relay base station coverage area 44 and donor base station coverage area 40, to help illustrate a technological benefit of the present disclosure. Each of these figures shows by way of example the relay base station (e.g., at least WCD module 50) being within the donor base station coverage area 40 and the relay base station coverage area 44 at least partially overlapping with the donor base station coverage area 40. In particular, FIG. 4A shows the relay base station coverage area 44 partially overlapping with the donor base station coverage area 40, and FIG. 4B shows the relay base station coverage area 44 being fully encompassed by the donor base station coverage area 40.

With the arrangements shown in FIGS. 3, 4A, and 4B, as noted above, when paging controller encounters a trigger for paging WCD 46, it would be useful to provide an initial page to the WCD not only in relay base station coverage area 44 (as the currently registered coverage area of the WCD) but also in the associated donor base station coverage area 40, as there is a reasonable chance that the WCD has engaged in idle-mode handover to the donor base station coverage area. Whereas, when paging controller encounters a trigger for paging WCD 36, the paging controller could provide an initial page to the WCD merely in non-relay base station coverage area 34 (as the currently registered coverage area of WCD).

Figure 5:
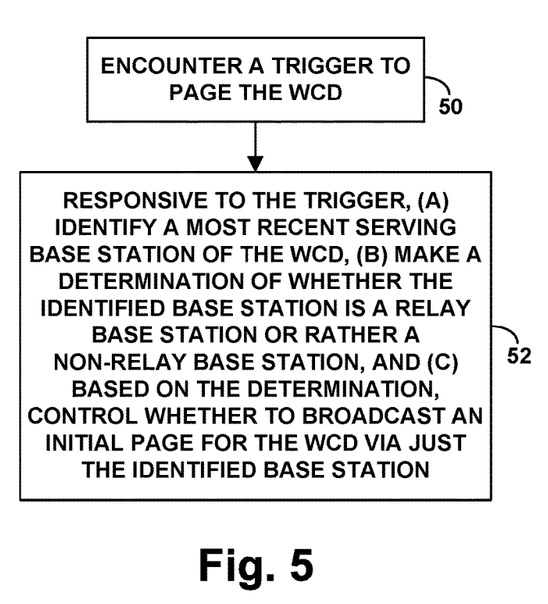
FIG. 5 is a flow chart depicting operations of an example method.

FIG. 5 is next a flow chart depicting operations that can be carried out in accordance with the present disclosure, to control paging of a WCD in a wireless communication system having a plurality of base stations, where each base station is either (i) a relay base station having a wireless backhaul connection served by a donor base station or (ii) a non-relay base station not having a wireless backhaul connection served by a donor base station. Features of this method could be implemented by a paging controller as described above and/or by one or more entities.

As shown in FIG. 5, at block 50, the method includes encountering a trigger to page the WCD. In turn, at block 52, the method includes, responsive to the trigger, (a) identifying a most recent serving base station of the WCD, (b) making a determination of whether the identified base station is a relay base station or rather a non-relay base station, and (c) based on the determination, controlling whether to broadcast an initial page for the WCD via just the identified base station. In particular, in line with the discussion above, (i) if the determination is that the identified base station is a non-relay base station, then the initial page for the WCD is broadcast via just the identified base station and (ii) if the determination is that the identified base station is a relay base station, then the initial page for the WCD is broadcast via both the identified base station and the donor base station that serves the wireless backhaul connection for the identified base station.

In this method, the act of encountering the trigger to page the WCD could involve a paging controller (e.g., MSC or MME) receiving a signal indicating that a communication is to be provided to the WCD. For instance, this could involve receiving a signal indicating an incoming call to be connected to the WCD and/or incoming packet-data communication to be sent to the WCD. Further, the method could be particularly useful when the incoming communication is a voice over Internet Protocol (VoIP) call placed to the WCD and thus where the initial page is for that VoIP call, as the method could help expedite successful paging of the WCD and thus provide possibly quicker connection of the call in a scenario where the WCD is currently registered in a relay base station's coverage area but has engaged in idle handover to the associated donor base station's coverage area.

In addition, the act of broadcasting the initial page via both the identified base station and the donor base station could involve the paging controller concurrently transmitting the initial page to the identified base station and the donor base station for broadcast by both of those base stations. For instance, the paging controller could multicast the page message to these base stations, or the paging controller could send the messages to the base stations in quick succession, which could still be considered concurrent transmission, as both would occur as the first page attempt without first waiting for a response from the WCD. And likewise, the act of broadcasting the initial page via just the identified base station could involve the paging controller transmitting the initial page to just the identified base station for broadcast by just the identified base station.

Further, the act of identifying the identifying the most recent serving base station of the WCD could take various forms. For instance, this act could involve identifying as the most recent serving base station of the WCD a base station via which the WCD most recently re-registered or otherwise provided a paging zone update or other tracking-area-update while in a radio-link-layer idle mode. Or this act could involve identifying as the most recent serving base station of the WCD a base station to which the WCD most recently handed over while in a radio-link-layer connected mode. Moreover, the act of making the determination of whether the identified base station is a relay base station or rather a non-relay base station could involve referring to data that indicates whether the identified base station is a relay base station or rather a non-relay base station.

Figure 6:
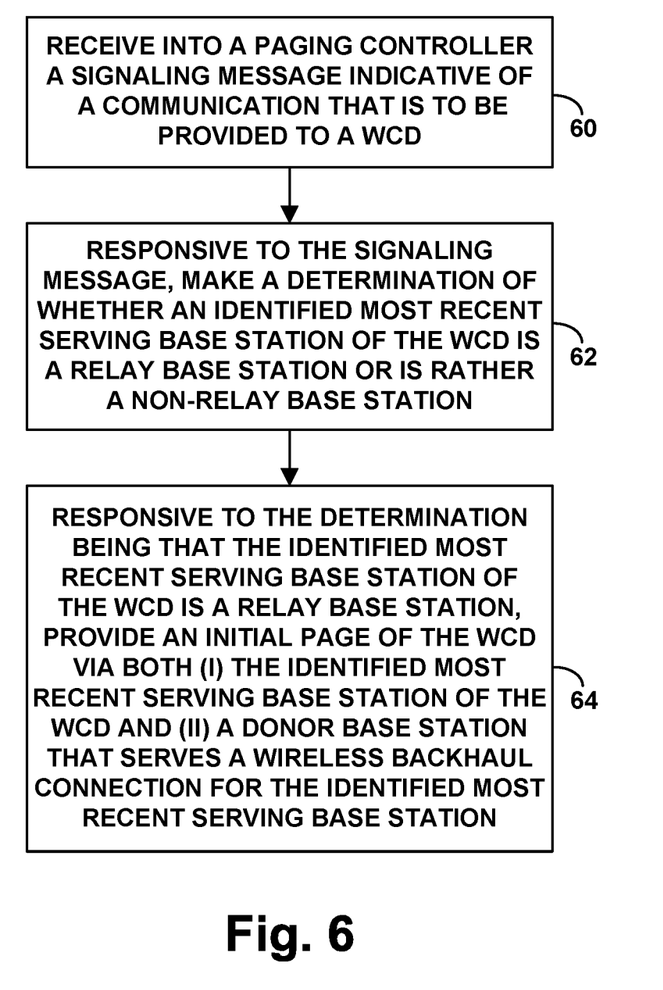
FIG. 6 is another flow chart depicting operations of an example method.

FIG. 6 is next another flow chart depicting a method for controlling paging of a WCD, which could be similarly implemented by a paging controller and/or one or more other entities. As shown in FIG. 6, at block 60, the method includes receiving into the paging controller a signaling message indicative of a communication that is to be provided to the WCD. At block 62, the method then includes, responsive to the signaling message, making a determination of whether an identified most recent serving base station of the WCD is a relay base station or is rather a non-relay base station. And the method then includes, at block 64, responsive to the determination being that the identified most recent serving base station of the WCD is a relay base station, providing an initial page of the WCD via both (i) the identified most recent serving base station of the WCD and (ii) a donor base station that serves a wireless backhaul connection for the identified most recent serving base station.

Features discussed above could be implemented in the context of this method as well, and vice versa. For instance, in this method, the act of providing the initial page of the WCD via both the identified last serving base station of the WCD and the donor base station that serves a wireless backhaul connection for the identified last serving base station could involve transmitting the initial page simultaneously (e.g., at the same time and/or in direct succession without waiting for a response) to both the identified last serving base station and the donor base station, for wireless broadcast of the initial page by both the identified last serving base station and the donor base station.

Figure 7:
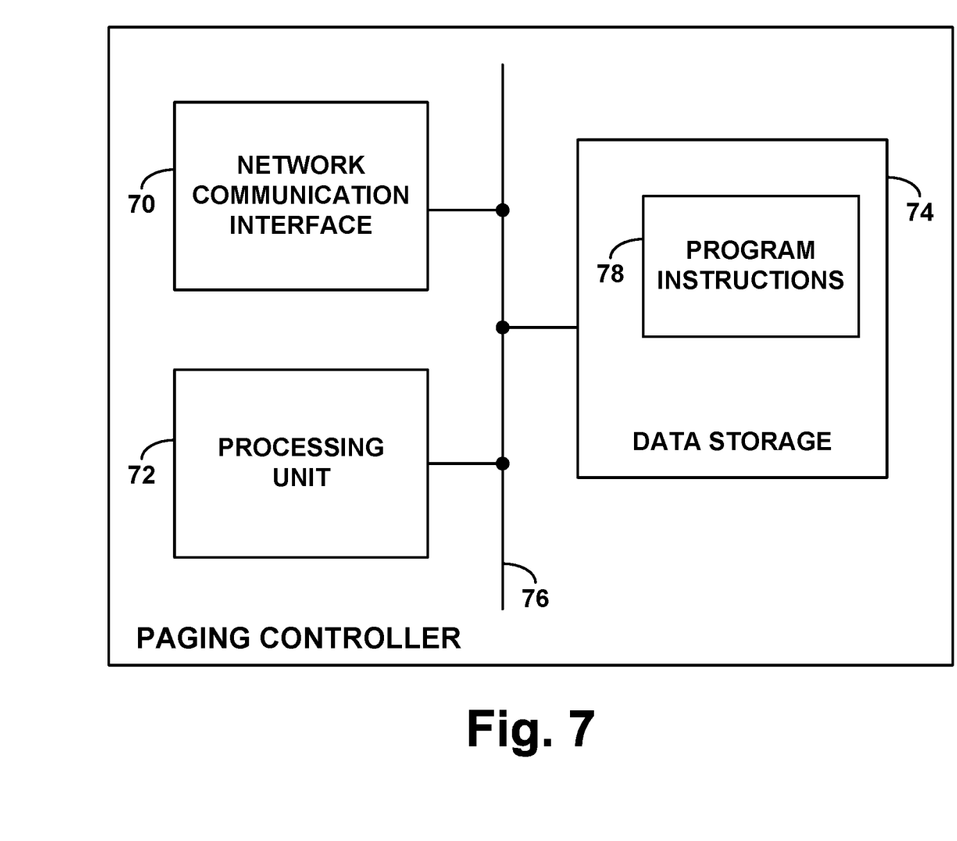
FIG. 7 is a simplified block diagram of an example paging controller.

Finally, FIG. 7 is a simplified block diagram of an example paging controller, showing some of the components that could be included in such a controller to facilitate implementing various operations as described above, in a wireless communication system as discussed above. In line with the discussion above, this paging controller could be an MSC or an MME, or the paging controller could take various other forms.

As shown in FIG. 7, the example paging controller includes a network communication interface 70, a processing unit 72, and non-transitory data storage 74, all of which could be communicatively linked together by a system bus, network, or other connection mechanism 76. Further, these components could be integrated with each other in various ways or provided in another manner.

Network communication interface 70 could comprise an Ethernet or other network interface module through which to engage in network communications with at least various base stations in the system as well as with other network entities. Processing unit 72 could then comprise one or more microprocessors and/or specialized processing circuits. And data storage 74 could comprise one or more volatile and/or non-volatile storage components, such as magnetic, optical, or flash storage.

As shown, data storage 74 could then hold program instructions 78, which could be executable by processing unit 72 to carry out various features described above. For instance, the operations could include encountering a trigger to page the WCD and, responsive to the trigger, (a) identifying a most recent serving base station of the WCD, (b) making a determination of whether the identified base station is a relay base station or rather a non-relay base station, and (c) based on the determination, controlling whether to broadcast an initial page for the WCD via just the identified base station. And as discussed above, (i) if the determination is that the identified base station is a non-relay base station, then the initial page for the WCD is broadcast via just the identified base station, whereas (ii) if the determination is that the identified base station is a relay base station, then the initial page for the WCD is broadcast via both the identified base station and the donor base station that serves the wireless backhaul connection for the identified base station.

In line with the discussion above, the act of the paging controller broadcasting the initial page via just the identified base station could involve transmitting the initial page from the paging controller to just the identified base station, for wireless broadcast of the initial page by the identified base station. And the act of the paging controller broadcasting the initial page via both the identified base station and the donor base station could involve (i) transmitting the initial page from the paging controller to the identified base station, for wireless broadcast of the initial page by the identified base station and (ii) transmitting the initial page from the paging controller to the donor base station, for wireless broadcast of the initial page by the donor base station.

Other features discussed above can be applied in this context as well, and vice versa.

Exemplary embodiments have been described above. Those skilled in the art will understand, however, that changes and modifications may be made to these embodiments without departing from the true scope and spirit of the invention.

What is claimed is:

1. A method of controlling paging of a wireless client device (WCD) in a wireless communication system having a plurality of base stations, wherein each base station is either (i) a relay base station having a wireless backhaul connection served by a donor base station or (ii) a non-relay base station not having a wireless backhaul connection served by a donor base station, the method comprising:
    encountering a trigger to page the WCD; and
    responsive to the trigger, (a) identifying a most recent serving base station of the WCD, (b) making a determination of whether the identified base station is a relay base station or rather a non-relay base station, and (c) based on the determination, controlling whether to broadcast an initial page for the WCD via just the identified base station,
    wherein (i) if the determination is that the identified base station is a non-relay base station, then the initial page for the WCD is broadcast via just the identified base station and (ii) if the determination is that the identified base station is a relay base station, then the initial page for the WCD is broadcast via both the identified base station and the donor base station that serves the wireless backhaul connection for the identified base station.

2. The method of claim 1, carried out by a paging controller in the wireless communication system,
    wherein broadcasting the initial page via just the identified base station comprises transmitting the initial page from the paging controller to just the identified base station, for wireless broadcast of the initial page by the identified base station, and
    wherein broadcasting the initial page via both the identified base station and the donor base station comprises (i) transmitting the initial page from the paging controller to the identified base station, for wireless broadcast of the initial page by the identified base station and (ii) transmitting the initial page from the paging controller to the donor base station, for wireless broadcast of the initial page by the donor base station.

3. The method of claim 2, wherein broadcasting the initial page via both the identified base station and the donor base station comprises concurrently transmitting the initial page to the identified base station and the donor base station.

4. The method of claim 1, wherein the paging controller is a mobility management entity.

5. The method of claim 1, wherein the paging controller is a mobile switching center.

6. The method of claim 1, wherein encountering the trigger to page the WCD comprises receiving a signal indicating that a communication is to be provided to the WCD.

7. The method of claim 1, wherein identifying the most recent serving base station of the WCD comprises identifying as the most recent serving base station of the WCD a base station via which the WCD most recently provided a tracking-area-update while in a radio-link-layer idle mode.

8. The method of claim 1, wherein identifying the most recent serving base station of the WCD comprises identifying as the most recent serving base station of the WCD a base station to which the WCD most recently handed over while in a radio-link-layer connected mode.

9. The method of claim 1, wherein making the determination of whether the identified base station is a relay base station or rather a non-relay base station comprises:
    referring to data that indicates whether the identified base station is a relay base station or rather a non-relay base station.

10. The method of claim 1, wherein controlling whether to broadcast the initial page for the WCD via just the identified base station is further in based on the initial page being for a voice over Internet Protocol (VoIP) call placed to the WCD.

11. A method for controlling paging of a wireless client device (WCD), the method comprising:
    receiving into a paging controller a signaling message indicative of a communication that is to be provided to the WCD; and
    responsive to the signaling message, (a) making a determination of whether an identified most recent serving base station of the WCD is a relay base station or is rather a non-relay base station, and (b) responsive to the determination being that the identified most recent serving base station of the WCD is a relay base station, providing an initial page of the WCD via both (i) the identified most recent serving base station of the WCD and (ii) a donor base station that serves a wireless backhaul connection for the identified most recent serving base station.

12. The method of claim 11, wherein providing the initial page of the WCD via both the identified last serving base station of the WCD and the donor base station that serves a wireless backhaul connection for the identified last serving base station comprises:
    transmitting the initial page simultaneously to both the identified last serving base station and the donor base station, for wireless broadcast of the initial page by both the identified last serving base station and the donor base station.

13. A paging controller operable in a wireless communication system to control paging of a wireless client device (WCD), wherein the wireless communication system has a plurality of base stations, wherein each base station is either (i) a relay base station having a wireless backhaul connection served by a donor base station or (ii) a non-relay base station not having a wireless backhaul connection served by a donor base station, the paging controller comprising:
    a network communication interface through which to engage in network communications with at least the base stations;
    a processing unit;
    non-transitory data storage;

program instructions stored in the non-transitory data storage and executable by the processing unit to carry out operations comprising encountering a trigger to page the WCD and, responsive to the trigger, (a) identifying a most recent serving base station of the WCD, (b) making a determination of whether the identified base station is a relay base station or rather a non-relay base station, and (c) based on the determination, controlling whether to broadcast an initial page for the WCD via just the identified base station, wherein (i) if the determination is that the identified base station is a non-relay base station, then the initial page for the WCD is broadcast via just the identified base station and (ii) if the determination is that the identified base station is a relay base station, then the initial page for the WCD is broadcast via both the identified base station and the donor base station that serves the wireless backhaul connection for the identified base station.

14. The paging controller of claim 13, wherein broadcasting the initial page via just the identified base station comprises transmitting the initial page from the paging controller to just the identified base station, for wireless broadcast of the initial page by the identified base station, and wherein broadcasting the initial page via both the identified base station and the donor base station comprises (i) transmitting the initial page from the paging controller to the identified base station, for wireless broadcast of the initial page by the identified base station and (ii) transmitting the initial page from the paging controller to the donor base station, for wireless broadcast of the initial page by the donor base station.

15. The paging controller of claim 14, wherein broadcasting the initial page via both the identified base station and the donor base station comprises concurrently transmitting the initial page to the identified base station and the donor base station.

16. The paging controller of claim 13, wherein the paging controller is selected from the group consisting of a mobility management entity and a mobile switching center.

17. The paging controller of claim 13, wherein encountering the trigger to page the WCD comprises receiving a signal indicating that a communication is to be provided to the WCD.

18. The paging controller of claim 13, wherein identifying the most recent serving base station of the WCD comprises identifying as the most recent serving base station of the WCD a base station via which the WCD most recently provided a tracking-area-update while in a radio-link-layer idle mode.

19. The paging controller of claim 13, wherein identifying the most recent serving base station of the WCD comprises identifying as the most recent serving base station of the WCD a base station to which the WCD most recently handed over while in a radio-link-layer connected mode.

20. The paging controller of claim 13, wherein the data storage holds data that indicates whether the identified base station is a relay base station or rather a non-relay base station, and wherein making the determination of whether the identified base station is a relay base station or rather a non-relay base station comprises referring to the data.

* * * * *